US006172793B1

(12) United States Patent
Heberle et al.

(10) Patent No.: US 6,172,793 B1
(45) Date of Patent: Jan. 9, 2001

(54) APPARATUS FOR COHERENTLY CONTROLLING AN OPTICAL TRANSITION

(75) Inventors: Albert P. Heberle; Jeremy J. Baumberg, both of Cambridge (GB)

(73) Assignee: Hitachi Europe Limited, Berkshire (GB)

(*) Notice: Under 35 U.S.C. 154(b), the term of this patent shall be extended for 0 days.

(21) Appl. No.: 08/645,857

(22) Filed: May 14, 1996

(30) Foreign Application Priority Data

May 25, 1995 (EP) .................................................. 95303550

(51) Int. Cl.⁷ ...................................................... G02F 1/03
(52) U.S. Cl. .......................... 359/264; 359/262; 359/320
(58) Field of Search ................................... 359/244, 248, 359/262, 264, 320, 260, 577, 589

(56) References Cited

U.S. PATENT DOCUMENTS

| | | | | |
|---|---|---|---|---|
| 3,766,498 | * | 10/1973 | Brewer et al. ........................ | 359/264 |
| 4,528,464 | * | 7/1985 | Chemla et al. ....................... | 307/425 |
| 4,900,134 | * | 2/1990 | Inoue et al. ........................... | 359/244 |
| 5,268,785 | * | 12/1993 | Crenshaw et al. ..................... | 359/244 |
| 5,805,327 | * | 9/1998 | Usami et al. .......................... | 359/244 |

FOREIGN PATENT DOCUMENTS

| | | |
|---|---|---|
| 651 448 | 5/1995 | (EP) . |
| WO 84/03363 | 8/1984 | (WO) . |

OTHER PUBLICATIONS

Physical Review Letters, vol. 73, No. 5, Aug. 1, 1994, J.Y. Marzin et al.: Photoluminescence of Single InAs Quantum Dots Obtained by Self–Organized Growth on GAAs.
Appl. Phys. Lett. 41(3), Aug. 1, 1982, H. M. Gibbs et al.: Room–temperatur excitonic optical bistability in a GaAs–GaAIAs superlattice etalon.
Appl. Phys. Lett. 57 (26), Dec. 24, 1990, Hiroyuki Sakaki et al.: Optical Absorption and Carrier–Induced Bleaching Effect in Quantum Wire and Quantum Box Structures.
Appl. Phys. Lett. 58(17), Apr. 29, 1991, M. Lambsdorff et al.: Subpicosecond carrier lifetimes in radiation–damaged GaAs.
Appl. Phys. Lett. 59(16), Oct. 14, 1991, Yi Chen et al.: 375–GHz–bandwidth photoconductive detector.
Appl. Phys. Lett. 58(22), Jun. 3, 1991, M. Klingenstein et al.: Transit time limited response of GaAs metal–semiconductor–metal photodiodes.
Physical Review Letters, vol. 59, No. 20, Nov. 16, 1987, M. Tsuchiya et al.: Tunneling Escape Rate of Electrons From Quantum Well in Double–Barrier Heterostructures.
Appl. Phys. Lett. 61(16), Oct. 19, 1992, A. Tackeuchi et al.: Picosecond signal recovery in type II tunneling bi–quantum well etalon.
Quantum Electronics and Laser Science Conference (QELS) 1991—QELS '91 Technical Digest, pp. 144–145, Kobayahsi et al.: Coherent push–pull transition for ultrafast optical switching.
Japanese Journal of Applied Physics—Extendd Abstracts of the 1991 International Conference on Solid State Devices and Materials, Yokohama, japan Aug. 27–29, 1991, pp. 378–380, Kobayashi et al.: Ultrafast optoelectronic devices.

* cited by examiner

Primary Examiner—Huy Mai
(74) Attorney, Agent, or Firm—Kenyon & Kenyon

(57) ABSTRACT

Optically generated charge carriers in an optically responsive medium, such as an optical switch, which are produced in response to a first pulse of optical radiation ($P_1$), are de-excited by directing a second pulse ($P_2$) of optical radiation into the medium. The second pulse occurs while the excitation produced by the first pulse remains coherent, and the relative phase of the first and second pulses is selected so that the second pulse destructively interferes with the excitation produced by the first pulse. The apparatus may be used as an optical switch or as a photodetector.

40 Claims, 4 Drawing Sheets

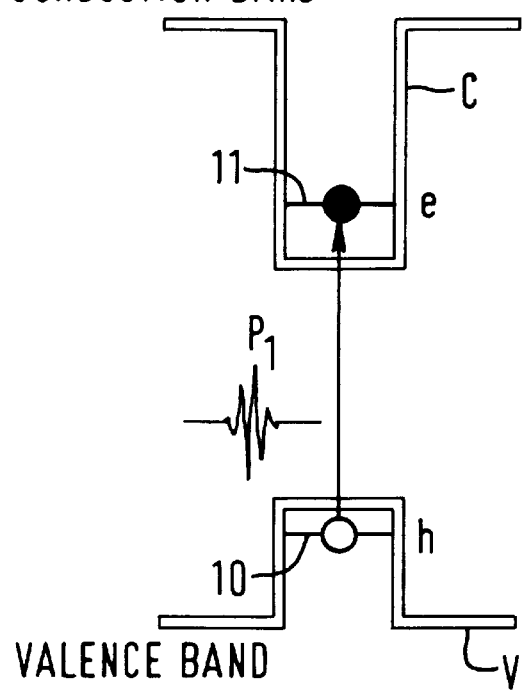
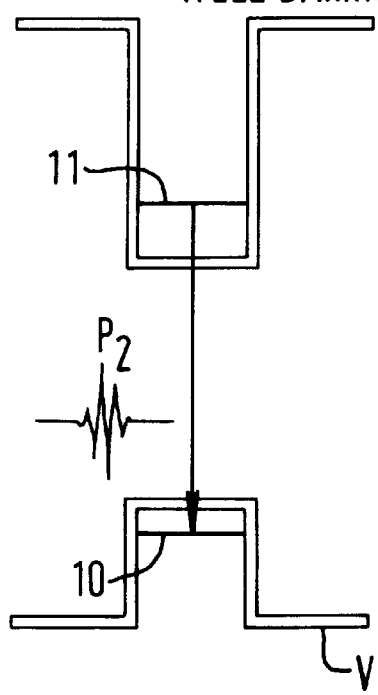
EXCITATION
FIG. 3A
DEEXCITATION BY COHERENT DESTRUCTION
FIG. 3B
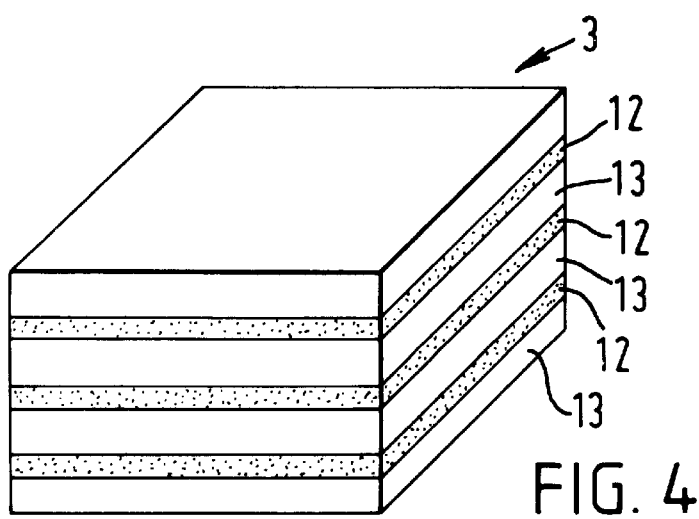
FIG. 4

GROWTH DIRECTION

GROWTH DIRECTION

APPARATUS FOR COHERENTLY CONTROLLING AN OPTICAL TRANSITION

FIELD OF THE INVENTION

This invention relates to an apparatus for controlling an optical transition and has particular but not exclusive application to optical switching performed by producing optically generated resonant excitation of charge carriers in multiple quantum wells (MQWs), and photodetectors.

Optical switching and photodetection using MQWs is attracting much interest because of its potential for ultrafast optical switching for computing, and also for ultrafast optical detection. For example, reference is directed to our co-pending EP-A-0 651 448 which discloses GaAs metal-semiconductor-metal (MSM) photoconductors for photodetection. Reference is also directed to H. M. Gibbs et al, Appl. Phys. Lett. 41, 221 (1982) for a discussion of switchable optical bi-stability in a GaAs etalon.

In such devices, an input, or first optical pulse produces excitation within an optically responsive medium, with the result that it changes its optical or electrical characteristics. In the aforementioned semiconductor devices, the pulse raises charge carriers to an excited state, producing electron-hole-pairs or excitons. The speed of operation of such devices is limited by the dwell time of the optically excited carriers in the devices. High speed devices require a fast mechanism to get rid of these carriers shortly after the optical excitation.

A number of techniques have been proposed previously. It has been proposed to use materials which have a short carrier lifetime for fast carrier trapping, for example GaAs grown at a low substrate temperature. For example Y. Chen et al Appl. Phys. Lett. 59, 1984 (1991) discloses that a high defect density in an optically active material causes a short carrier lifetime. In particular, Chen et al disclose that LT-GaAs grown by molecular beam epitaxy at a substrate temperature of 200° C. results in a carrier lifetime of less than 0.5 ps for a MSM-photodetector. The problem associated with the use of LT-GaAs material is that the quality of the optically responsive layer is reduced and it becomes more difficult to optimise the device parameters when it is integrated with other devices that require material of long carrier lifetime. Reference is also directed to M. Lambsdorff et al, Appl. Phys. Lett. 58, 1881–1883 (1991).

An alternative approach is to sweep charge carriers rapidly out of the optical responsive medium. Reference is directed to M. Klingenstein et al, Appl. Phys. Lett. 58, 2503 (1991). This technique is used in eg P—I—N photodiodes and MSM photodetectors and typically the fastest responsive time is of the order of 10 ps.

A further technique involves tunnelling from quantum wells formed in the optically responsive medium. Reference is directed to M. Tsuchiya et al Phys. Rev. Lett. 59, 2356 (1987) and A. Tackeuchi et al Appl. Phys. Lett. 61, 1892 (1992). This technique has been proposed for fast optical switches. In use, optically generated charge carriers resonantly tunnel out of the MQWs but internal scattering reduces the response time to 2 ps. Furthermore, in practice, the excited carriers are not completely removed from the device, which causes detrimental accumulation effects.

It has been proposed to use a coherent pulse scheme to produce fast optical switching in which first and second coherent pulses are used to switch a transition on and off. Reference is directed to Kobayashi, T. et al, "Coherent push-pull transition for ultrafast optical switching", Quantum Electronics and Laser Science Conference (QELS) 1991—QELS '91 Technical Digest, paper QWD21, pages 144–145; and "Ultrafast optoelectronic devices", Japanese Journal of Applied Physics—Extended Abstracts of the 1991 International Conference on Solid State Devices and Materials, Yokohama, Japan, 27–29 August 1991, pages 378–380.

However, these devices use a bulk resonant absorber and difficulties can arise in achieving satisfactory switching.

STATEMENT OF THE INVENTION

The present invention seeks to provide rapid de-excitation in the optically responsive medium, without the aforementioned disadvantages.

According the invention there is provided apparatus for controlling an optical transition, comprising an optically responsive medium; means for directing a first pulse of optical radiation of a given wavelength characteristic to the medium to produce a resonant excitation therein so as to change characteristics of the medium, and means for directing a second pulse of optical radiation to the medium, the relative timing of the first and second pulses and the relative phase of the radiation thereof being selected so that the second pulse de-excites the resonant excitation produced by the first pulse, wherein the optically responsive medium exhibits first and second energy levels for providing a resonant transition of a relatively narrow linewidth, and a third energy level, the transition between the second and third energy levels having a relatively wide linewidth, both of the transitions being simultaneously excited and de-excited by the first and second pulses.

The invention also provides apparatus for controlling an optical transition, comprising an optically responsive medium; means for directing a first pulse of optical radiation of a given wavelength characteristic to the medium to produce a resonant excitation therein so as to change characteristics of the medium, and means for directing a second pulse of optical radiation to the medium, the relative timing of the first and second pulses and the relative phase of the radiation thereof being selected so that the second pulse de-excites the resonant excitation produced by the first pulse, wherein the optically responsive medium comprises a plurality of nanoscale elements for producing said resonant excitation in response to the first pulse.

The apparatus according to the invention can be used as an optical switch, which includes means for directing an optical beam through the medium to an output path, transmission of the input beam through the medium being switched by the first and second pulses.

The apparatus according to the invention can also be used as a photodetector, in which the optically responsive medium changes its electrical characteristics in response to the resonant excitation produced by the first pulse, the second pulse producing de-excitation in preparation for a subsequent detection of a further input optical pulse.

The optically responsive medium may comprise a semiconductor having valence and conduction bands, with the resonant excitation resulting in a charge carrier transition between the bands.

The invention has the advantage that extremely fast de-excitation of photoexcited carriers in the medium can be achieved. The fastest time resolution that is achievable according to the invention is determined by the duration of the first and second optical pulses and is not limited by internal material properties of the photoresponsive medium. The response time can therefore be optimised separately from the other parameters.

BRIEF DESCRIPTION OF THE DRAWINGS

In order that the invention may be more fully understood, embodiments thereof will now be described by way of example with reference to the accompanying drawings, in which:

FIGS. 3A and B illustrate excitation and de-excitation of a charge carrier in the absorber shown in FIG. 1 in response to successive pulses $P_1$ and $P_2$;

FIG. 4 is a schematic illustration of one form of the absorber which comprises multiple quantum wells;

DETAILED DESCRIPTION

Figure 1:
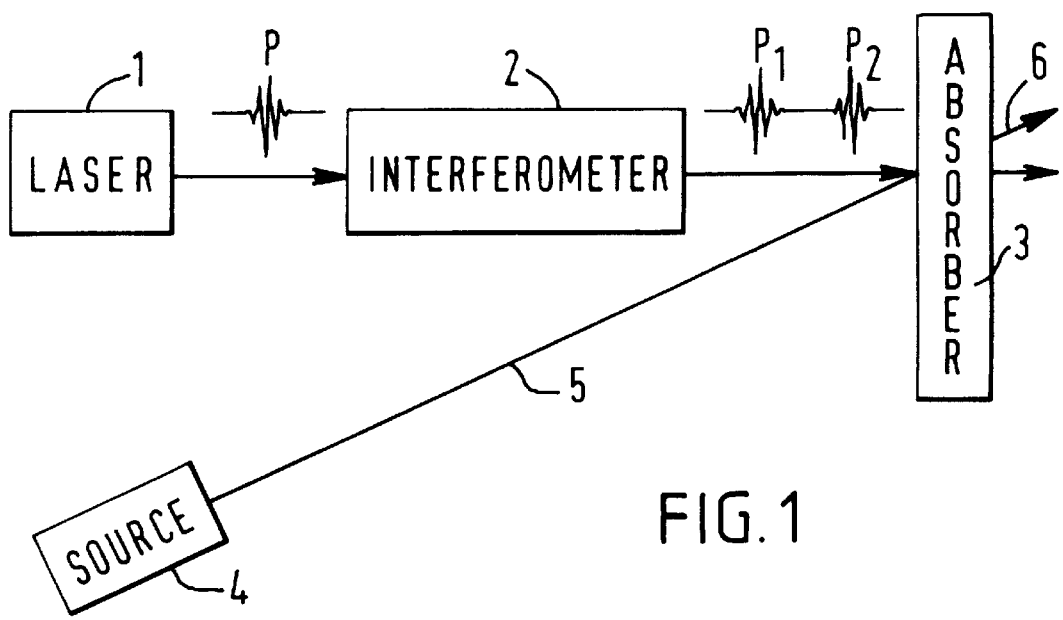
FIG. 1 is a schematic block diagram of an optical switch in accordance with the invention.

Referring to FIG. 1, a femtosecond laser source 1 produces short duration pulses of duration e.g.<100 fs typically at a wavelength of 800 nm, 1.3 $\mu$m or 1.5 $\mu$m for optical fibre communication, which are fed through an interferometer 2, to be explained in more detail hereinafter, into an optically responsive medium 3 in the form of a saturable absorber. In this illustrative example, the saturable absorber is a semiconductor. Normally, the absorber is optically non-transmissive but in response to a pulse P from the laser, is switched into transmissive state. This is used to switch an input optical beam from source 4 that passes along an input path 5 to the absorber 3. The beam passes to an output path 6 through the absorber when it is switched to a transmissive state by a pulse P from the laser 1. The beam from source 4 can also be modulated by the change in refractive index n of the responsive medium.

As is well known in the art, the effect of the pulse P is to excite an electron in the valence band of the absorber into the conduction band, with the result that the absorber changes from an optically non-transmissive state to an optically transmissive state due to the creation of an electron-hole-pair, known as an exciton. Thereafter, this resonant transition decays back to a non-excited state. This optical transition, which is resonantly excited by the short pulse from the laser 1, stays coherent with the radiation forming the optical pulse P for a time $T_2=h/\pi\Gamma$. The homogeneous linewidth of the transition is $\Gamma$ and h is Heisenberg's constant. The coherence decays exponentially with time.

In accordance with the present invention, it has been appreciated that after excitation with a first pulse $P_1$, a second pulse $P_2$ can be applied to de-excite the optical transition, if the second pulse is applied to the absorber after a short time $\Delta T$ following the first pulse, during which the excitation produced by the first pulse remains coherent, with the second pulse being 180° out of phase with the first pulse at the transition wavelength $\lambda_a$. As a result, the second pulse $P_2$ causes de-excitation by destructive interference.

Thus, if $\Delta T<<T_2$ with the optical radiation of the first and second pulses being 180° out of phase, the technique permits optical excitons to be switched on and off for very short, well defined periods of time. The time resolution for this technique is limited by the width of the applied pulses P, which is of the order of 6 fs with present technology.

In order to produce the first and second pulses, the pulse P from the laser 1 is fed to the interferometer 2, typically a Michelson type interferometer, which produces two pulses $P_1$ and $P_2$ spaced apart in time by the short period $\Delta T$. The pulse P from the laser 1 has a centre wavelength $\lambda_a$ which corresponds to a narrow absorption line for the saturable absorber 3. In order to ensure that the pulses $P_1$ and $P_2$ are 180° out of phase, i.e. to ensure destructive interference, the interferometer 2 is configured to produce a temporal separation between the pulses as follows:

$$\Delta T=(n+1/2)\lambda_a/c$$

where n is an integer and c is the speed of light

The interferometer 2 is configured to set the integer n to a value that achieves the required pulse delay between the pulses $P_1$ and $P_2$.

Figure 2A:
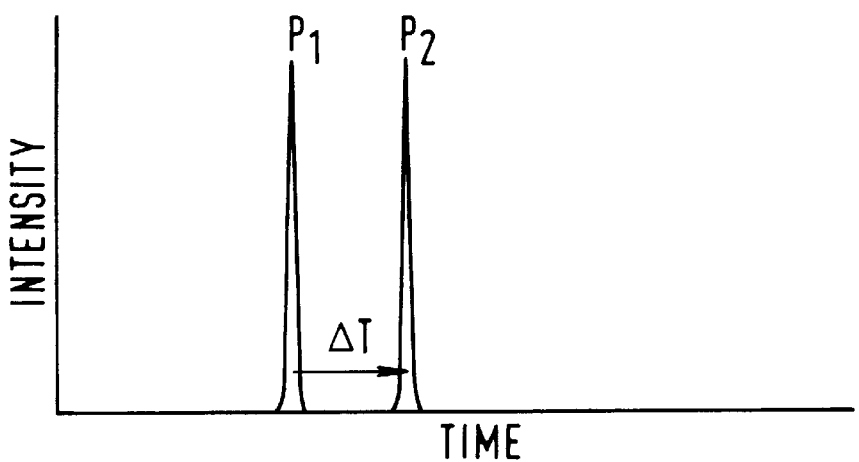
FIGS. 2A and B are graphs of the intensity of the successive pulses $P_1$ and $P_2$ with time, and the corresponding change in optical transmission characteristics of a semiconductor absorber.
Figure 2B:
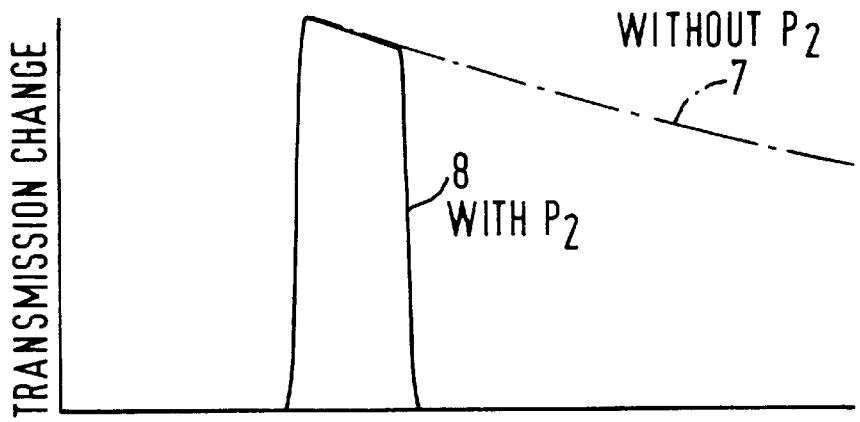

FIG. 2 illustrates the operation of the optical switch. FIG. 2A shows the timing of the first and second pulses $P_1$ and $P_2$. The first pulse $P_1$ produces an exciton in the saturable absorber with the result that its transmission characteristics change as shown in FIG. 2B. In the absence of pulse $P_2$, the resulting resonant excited state will decay relatively slowly as shown by the hatched line 7 in FIG. 2B. However, pulse $P_2$ produces a switched de-excitation of the resonant state in a rapid manner, as shown by the curve 8 in FIG. 3A. Because the pulse $P_2$ occurs within the time $\Delta T$ whilst the resonant excited state remains coherent with pulse $P_1$, and because pulse $P_2$ is in antiphase to pulse $P_1$, rapid de-excitation of the resonant state occurs.

This is explained in more detail in FIG. 3. In FIG. 3A, the pulse $P_1$ produces a resonant excitation in which an electron e is resonantly driven from energy level 10 in the valence band V to an energy level 11 in the conduction band C. The antiphase pulse $P_2$ positively drives the electron from the level 11 in the conduction band back to the valence band V thereby producing de-excitation by coherent destruction.

A first example of the saturable absorber 3 is shown in FIG. 4 and consists of a stack of quantum wells 12 formed by layers of GaAs material between barrier layers of $Al_xGa_{1-x}As$ 13 which form heterojunctions in a manner well known per se. The alternate layers are typically formed by conventional molecular beam epitaxy (MBE) techniques and for a more detailed discussion of the manner of manufacture, reference is directed to E. H. C. Parker, ed., "The Technology and Physics of Molecular Beam Epitaxy", Plenum, N.Y. 1985.

Figure 5:
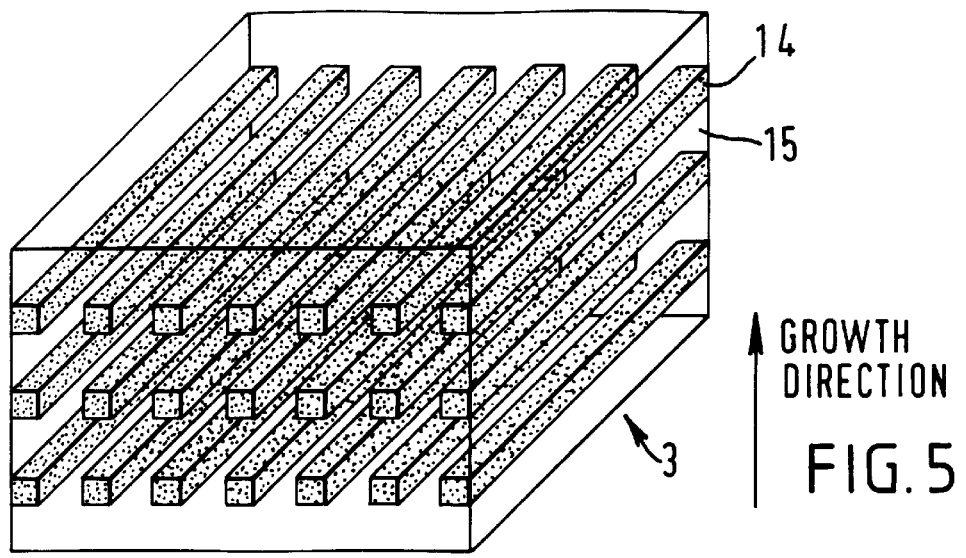
FIG. 5 illustrates an alternative form of the absorber which uses successive layers of quantum wires.
Figure 6:
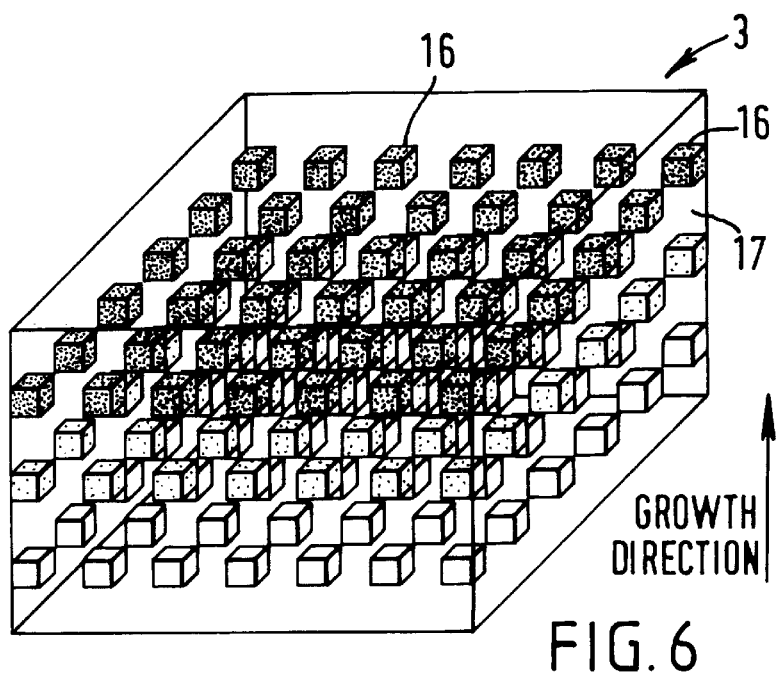
FIG. 6 illustrates an alternative form of the absorber which includes quantum dots.

Alternative structures are shown in FIGS. 5 and 6. In FIG. 5, a series of overlying layers of quantum wires 14, typically formed of GaAs material by MBE and electron beam lithography, are formed overlying one another, spaced apart by barrier layers 15, typically of $Al_xGa_{1-x}As$, the various layers being grown one overlying the other in a manner known per se. Typical dimensions for the quantum wires are 20 nm. Typical layer thicknesses are 10 nm.

In FIG. 6, overlying layers of quantum dots 16 are shown, the dots typically being made of GaAs material and spaced by barrier layers 17 of $Al_xGa_{1-x}As$ material. For a further discussion on the formation of quantum dots and wires, reference is directed to Claude Weissbuch and Borge Vinter, "Quantum Semiconductor Structures", Academic Press, Boston 1991 and J.-Y. Marzin et al., Phys. Rev. Lett. 73, 716–719 (1994).

Figure 7:
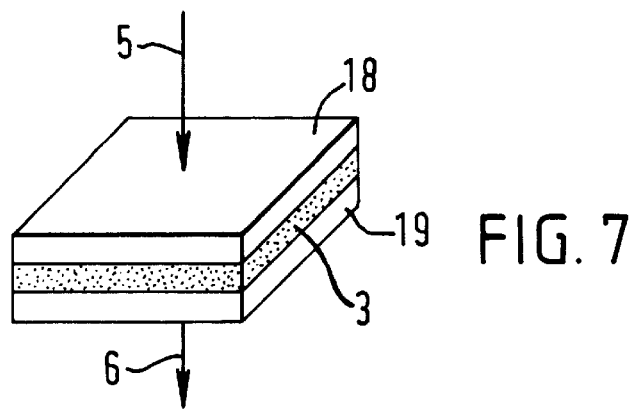
FIG. 7 illustrates a first configuration for an incoming optical beam to be switched by the absorber, where the beam is disposed orthogonally to a major plane of the absorber.

Referring now to FIG. 7, the saturable absorber 3 may be sandwiched between transparent support layers 18, 19 which extend generally parallel to the layers described with reference to any of FIG. 4 to 6. The incoming beam 5 may pass transversely through the various layers, as shown in FIG. 7. In a modification, the layer 19 is reflective, so that the beam is reflected back to pass a second time through the active layer 3 and leave on the same side as the incoming beam. Furthermore, the layers 18, 19 may be semireflective, so as to form an etalon that includes the active layer 3, for increased optical non-linearity.

Figure 8:
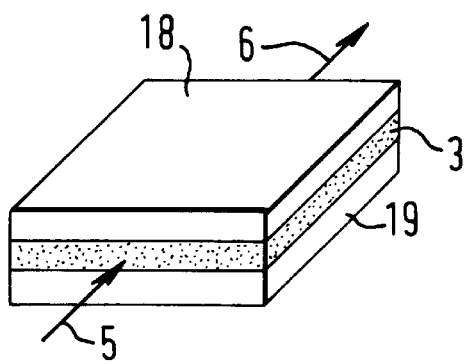
FIG. 8 illustrates an alternative arrangement in which the incoming beam passes through the absorber in a direction generally parallel to its major face.

Referring to FIG. 8, the incoming and outcoming beams 5, 6 may be passed generally parallel to the layers. This has the advantage that the layers 18, 19 can be used as light guides and the absorber can be easily integrated into other device structures formed on the substrate. The layers 18, 19 may typically be formed of AlAs. The laser photon energy is below the band gap energy of layers 18 and 19 to ensure that the layers are transparent.

Figure 9:
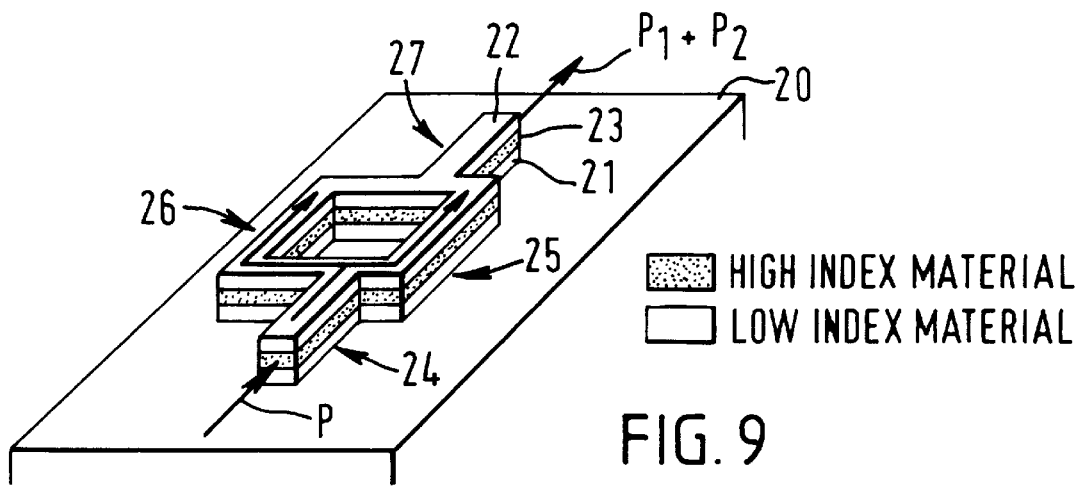
FIG. 9 is a schematic illustration of one form of interferometer shown in FIG. 1.

An example of the interferometer 2 shown in FIG. 1 will now be described in more detail with reference to FIG. 9. A substrate 20, typically formed of GaAs material is provided with overlying layers of relatively low refractive index material 21, 22 between which is sandwiched a layer of relatively high refractive index material 23. Typical examples of suitable materials are $Al_{0.3}Ga_{0.7}As$ for the high refractive index material and AlAs for the low index material. Many semiconductor pairs with different bandgaps are appropriate because a material with a larger bandgap usually has a lower refractive index. The various layers are formed into waveguides as shown in FIG. 9 by conventional optical or electron beam lithographic techniques to provide an input waveguide 24 for pulses P from laser 1 (FIG. 1). First and second branch paths 25, 26 of different lengths are coupled to the input path 24, the paths 26 being longer than path 25, and an output path 27 is coupled to the branch paths 25, 26. Thus, in use, the energy of input pulse P is split into the two branch paths 25, 26 and because the path 25 is shorter than path 26, the two closely spaced pulses $P_1$ and $P_2$ are formed. It will be appreciated that the pulses $P_1$ and $P_2$ have the same wavelength characteristic but are temporally spaced in time by $\Delta T$, dependant upon the relative path lengths of the branches 25, 26. It will be understood that by appropriate selection of the geometry and optical characteristics of the various paths shown in FIG. 9, the resultant pulses can have the desired temporal spacing whilst being 180° out of phase.

Figure 10:
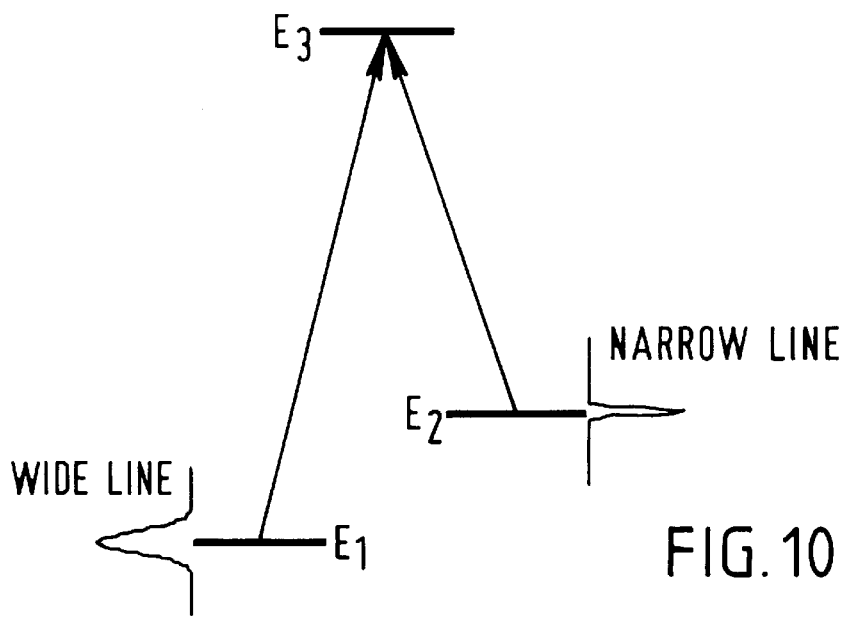
FIG. 10 illustrates an energy band scheme for providing an optical switch with a large line-width.

In order to achieve a good contrast ratio, in practice, the linewidth of the source 4 shown in FIG. 1 should be limited to the linewidth $\Gamma$ for the resonant transition. In FIG. 10, an energy level scheme is shown which does not impose this restriction. The optical transitions $E_1$–$E_3$ and $E_2$–$E_3$ have the level $E_3$ in common. Therefore, saturating $E_2$–$E_3$ also causes saturation of $E_1$–$E_3$. In practice, the level broadening $E_1$ and $E_2$ can be significantly different due to different scattering or different inhomogeneous broadening. If the linewidth of $E_2$–$E_3$ is much smaller than that of the linewidth of $E_1$–$E_3$, light pulses tuned to $E_2$–$E_3$ can switch the saturation of both $E_2$–$E_3$ and $E_1$–$E_3$ on and off by coherent destruction, in the manner previously described, allowing switching of a beam of energy $E_1$–$E_3$ without the linewidth limitation of $\Gamma$ in respect of the input beam 5. This scheme can be employed in semiconductor quantum structures where $E_2$–$E_3$ is the lowest heavy-hole exciton transition and $E_1$–$E_3$ is the lowest light-hole exciton transition.

Whilst the invention has been described in relation to an optical switch, it also has application to other situations in which excited resonant states are to be purged actively from an optically responsive medium. For example, the invention has application to ultrafast photodetectors. It is thus possible to apply the technique to the fast detection of transients on any light beam. If $\Gamma$ is large, and the delay between optical pulses $P_1$ and $P_2$ is set to be small (~10 fs) ultrafast photocurrents can be isolated.

Also, in the described embodiments, the resonant excitation is produced in a semiconductor material, in which an electron in a ground state in the valence band is excited and undergoes a transition into the conduction band. However, it is to be appreciated that the coherent de-excitation produced by the second pulse $P_2$ can also be used for transitions in material which are not necessarily associated with a semiconductor charge carrier transition. Generally, the invention will work with any material which exhibits a sufficiently narrow optical transition, even if the transition is not directly associated with charge carriers e.g. organic materials such as poly(phenyl-phenylenevinylene).

As used herein the term "optical radiation" is intended to include both visible and non-visible radiation, and includes infrared and ultraviolet radiation.

What is claimed is:

1. Apparatus for controlling an optical transition comprising:

an optically responsive medium;

a source to provide a first pulse of optical radiation of a predefined wavelength characteristic to the medium to produce a resonant excitation from a first energy level to a second energy level, the resonant transition between the first and second energy levels having a relatively narrow linewidth;

a source to provide a second pulse of optical radiation to the medium, the relative timing of the first and second pulses and the relative phase of the radiation thereof being selected so that the second pulse de-excites the resonant excitation produced by the first, another source to provide optical radiation to produce a resonant excitation from a third energy level to the second resonant level, the resonant transition between the second and third energy levels having a relatively wide linewidth;

wherein resonant transitions between the first and second energy levels control resonant transitions between the second and third transitions.

2. Apparatus according to claim 1 wherein the timing of the second pulse relative to the first pulse is selected so that the second pulse occurs whilst the excitation produced by the first pulse remains coherent with respect to the resonant excitation produced during the occurrence of the first pulse, and the relative phase of the radiation of the first and second pulses is selected so that the second pulse destructively interferes with the resonant excitation produced by the first pulse.

3. Apparatus according to claim 1 wherein the optically responsive medium changes its optical characteristics in response to said resonant excitation.

4. Apparatus according to claim 3 operative as an optical switch, including means for directing an input optical beam through said medium to an output path, transmission of the input beam through the medium being switched by said first and second pulses.

5. Apparatus according to claim 1 wherein the optically responsive medium comprises a plurality of nanoscale elements for producing said resonant excitation in response to the first pulse.

6. Apparatus according to claim 5 wherein the nanoscale elements are formed in overlying layers.

7. Apparatus according to claim 5 wherein the nanoscale elements comprise a multiple quantum well structure.

8. Apparatus according to claim 5 wherein the nanoscale elements comprise a plurality of quantum wires.

9. Apparatus according to claim 5 wherein the nanoscale elements comprise a plurality of quantum dots.

10. Apparatus according to claim 5 including support layers between which the nanoscale elements are disposed.

11. Apparatus according to claim 10 wherein both of said support layers are transparent.

12. Apparatus according to claim 10 wherein at least one of the support layers is semi-reflective.

13. Apparatus according to claim 10 wherein at least one of the support layers is reflective to optical radiation provided by said another source.

14. Apparatus according to claim 10, including means for directing optical radiation provided by said another source through the elements in a direction parallel to the support layers.

15. Apparatus according to claim 1 including an interferometer for forming the first and second pulses.

16. Apparatus according to claim 15 wherein the interferometer includes means defining an input optical path, means defining first and second branch paths of different optical lengths to produce the first and second pulses, and an output path for said first and second pulses.

17. Apparatus according to claim 1 wherein the optically responsive medium changes its electrical characteristics in response to said resonant excitation.

18. Apparatus according to claim 17 operative as a photodetector.

19. Apparatus according to claim 1 wherein the optical transition is produced by a resonant excitation of charge carriers in the optically responsive medium.

20. Apparatus according to claim 19 wherein the optically responsive medium comprises a semiconductor having valence and conduction bands, and the resonant excitation results in a charge carrier transition between the bands.

21. Apparatus for controlling an optical transition, comprising an optically responsive medium; means for directing a first pulse of optical radiation of a predefined wavelength characteristic to the medium to produce a resonant excitation therein so as to change characteristics of the medium, and means for directing a second pulse of optical radiation to the medium, the relative timing of the first and second pulses and the relative phase of the radiation thereof being selected so that the second pulse de-excites the resonant excitation produced by the first pulse, wherein the optically responsive medium comprises a plurality of nanoscale elements for producing said resonant excitation in response to the first pulse.

22. Apparatus according to claim 21 wherein the nanoscale elements are formed in overlying layers.

23. Apparatus according to claim 21 wherein the nanoscale elements comprise a multiple quantum well structure.

24. Apparatus according to claim 21 wherein the nanoscale elements comprise a plurality of quantum wires.

25. Apparatus according to claim 21 wherein the nanoscale elements comprise a plurality of quantum dots.

26. Apparatus according to claim 21 including support layers between which the nanoscale elements are disposed.

27. Apparatus according to claim 26 wherein both of said support layers are transparent.

28. Apparatus according to claim 26 wherein at least one of the support layers is semi-reflective.

29. Apparatus according to claim 26 wherein at least one of the support layers is reflective to optical radiation provided by said another source.

30. Apparatus according to claim 26 including means for directing optical radiation provided by said another source through the elements in a direction parallel to the support layers.

31. Apparatus according to claim 21 including an interferometer for forming the first and second pulses.

32. Apparatus according to claim 31 wherein the interferometer includes means defining an input optical path, means defining first and second branch paths of different optical lengths to produce the first and second pulses, and an output path for said first and second pulses.

33. Apparatus according to claim 21 wherein the optically responsive medium changes its electrical characteristics in response to said resonant excitation.

34. Apparatus according to claim 33 operative as a photodetector.

35. Apparatus according to claim 21 wherein the optical transition is produced by a resonant excitation of charge carriers in the optically responsive medium.

36. Apparatus according to claim 35 wherein the optically responsive medium comprises a semiconductor having valence and conduction bands, and the resonant excitation results in a charge carrier transition between the bands.

37. Apparatus for controlling an optical transition comprising:

an optically responsive medium;

a source to provide a first pulse of optical radiation of a predefined wavelength characteristic to the medium to produce a resonant excitation from a first energy level to a second energy level, the resonant transition between the first and second energy levels having a relatively narrow linewidth;

a second source to provide a second pulse of optical radiation to the medium, the relative timing of the first and second pulses and the relative phase of the radiation thereof being selected so that the second pulse de-excites the resonant excitation produced by the first, wherein the optically responsive medium is responsive to receive optical radiation to produce a resonant excitation from a third energy level to the second resonant level, the resonant transition between the second and third energy levels having a relatively wide linewidth and wherein the optically responsive medium is configured so that resonant transitions between the first and second energy levels control resonant transitions between the second and third energy levels.

38. Apparatus for controlling an optical transition comprising:

an optically responsive medium;

a source to provide a first pulse of optical radiation of a predefined wavelength characteristic to the medium to produce a resonant excitation from a first energy level to a second energy level, the resonant transition between the first and second energy levels having a relatively narrow linewidth;

a source to provide a second pulse of optical radiation to the medium, the relative timing of the first and second pulses and the relative phase of the radiation thereof being selected so that the second pulse de-excites the resonant excitation produced by the first, another source to provide optical radiation of wavelength corresponding to a resonant or near-resonant transition between a third energy level and the second resonant level, wherein resonant transitions between the first and second energy levels modulate optical radiation from said another source.

39. Apparatus according to claim 38 wherein optical radiation from said another source is modulated by a change in refractive index of the responsive medium.

40. Apparatus according to claim 38 wherein optical radiation from said another source is modulated by a change in absorption index of the responsive medium.

* * * * *